(No Model.) 2 Sheets—Sheet 1.
N. J. McARTHUR.
TELLURIAN.
No. 584,954. Patented June 22, 1897.
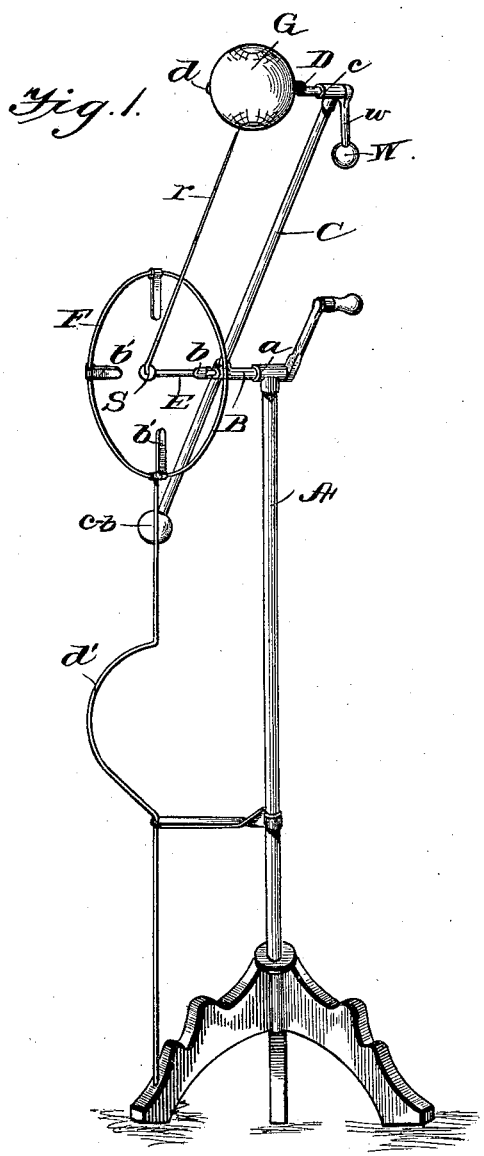
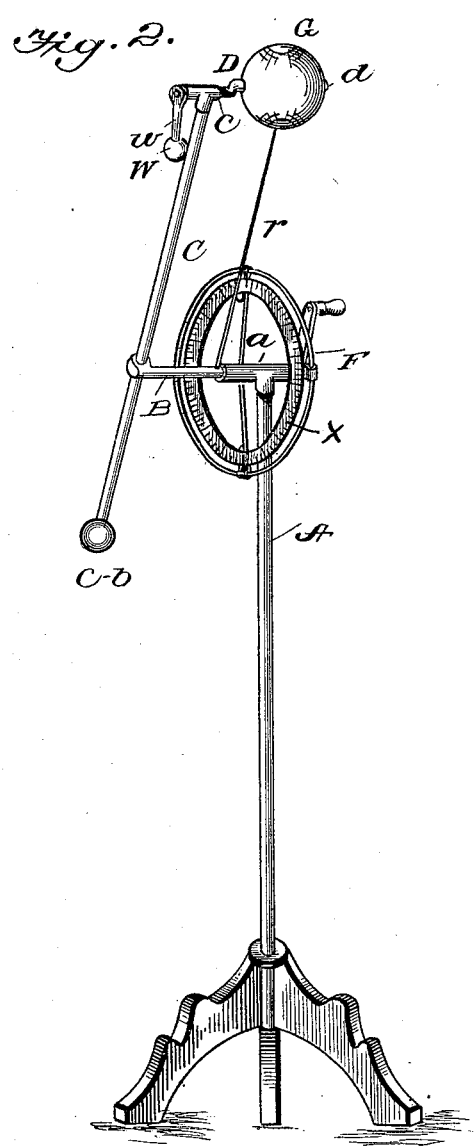
Witnesses
Simon Messer.
N. C. Lane.
Inventor:
Neel John McArthur,
by Bunyea & Bunyea,
Attorneys.
THE NORRIS PETERS CO., PHOTO-LITHO., WASHINGTON, D. C.

(No Model.) 2 Sheets—Sheet 2.
N. J. McARTHUR.
TELLURIAN.
No. 584,954. Patented June 22, 1897.
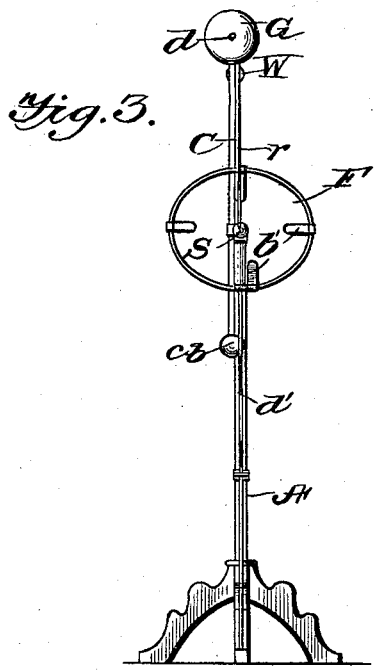
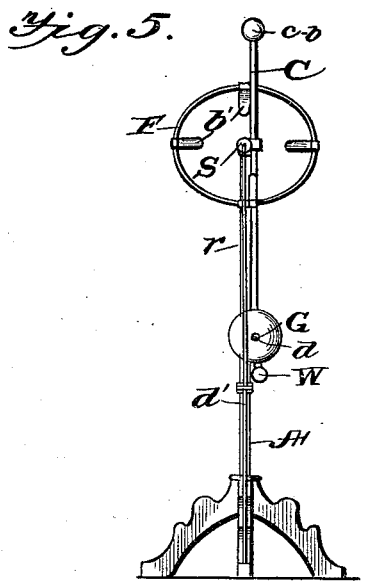
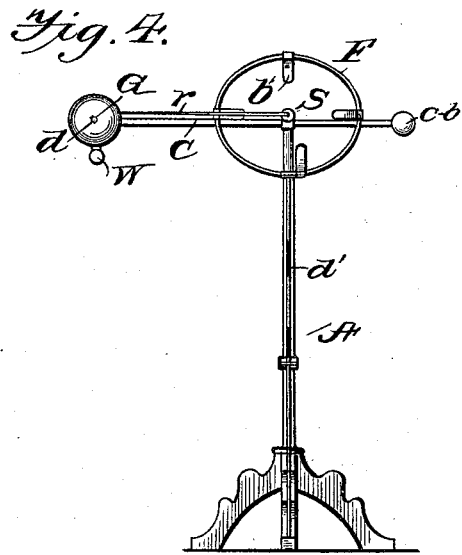
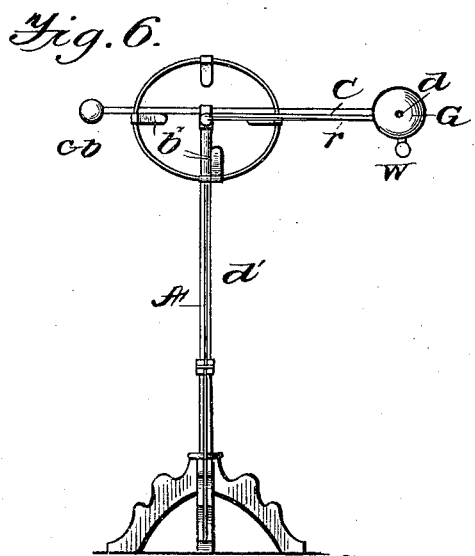
Witnesses
Simon Messer.
N. C. Lane.
Inventor:
Neil John McArthur,
by Bunyea & Bunyea,
Attorneys.

UNITED STATES PATENT OFFICE.

NEEL JOHN McARTHUR, OF AUSTIN, TEXAS, ASSIGNOR TO W. H. THAXTON, OF BLUFF SPRINGS, TEXAS.

TELLURIAN.

SPECIFICATION forming part of Letters Patent No. 584,954, dated June 22, 1897.

Application filed September 9, 1896. Serial No. 605,291. (No model.)

*To all whom it may concern:*

Be it known that I, NEEL JOHN MCARTHUR, a citizen of the United States, residing at Austin, in the county of Travis and State of Texas, have invented certain new and useful Improvements in Tellurians; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to tellurians for illustrating the relative movements of the heavenly bodies; and the object of my invention is to produce a device of this character which shall illustrate the axial and orbital movements of the earth and the directions of the sun's rays upon our globe at the various seasons of the year and to impart other information in relation to the movements of the earth by simple and effective means of automatic character.

I attain my object by means of the mechanical construction illustrated in the accompanying drawings, forming part of this specification, and in which—

Figure 1 is a perspective view of my tellurian. Fig. 2 is a similar view of a modified form thereof. Figs. 3, 4, 5, and 6 are side views of my device, illustrating the relative positions of the sun and earth at various seasons of the year, as will be referred to hereinafter.

Like letters indicate like parts wherever they occur.

Referring to Figs. 1 and 2, A represents a rod or support mounted at its lower end in a tripod or similar base and having at its upper end a T-coupling $a$, in which a horizontal rod B is journaled to freely revolve.

In Fig. 1, E indicates a small rod securely attached to rod B, extending outward therefrom and carrying at its outer end a small sphere $s$, which represents the sun, to the center of which is connected a pointer $r$, extending at right angles to rod $b$ for indicating the direction of the sun's rays upon the earth. Upon the opposite end of the rod B from the pointer an ordinary crank and handle are mounted for giving movement to the parts. The sun-sphere $s$ is mounted at the junction of the major and minor axes of the ring F. The ring represents the earth's orbit and is elliptical in form.

An arm C is attached to the rod B and revolves with it. This arm carries at one end a counterbalance $c\ b$, and at its opposite end is provided with a T-coupling $c$, in which is journaled to freely revolve an axis or shaft D, offset at one end for attachment of a globe G to represent the earth and to mount it at the proper inclination of twenty-three and one-half degrees from the vertical. The axis D has a short arm $w$, secured at one end thereof, and this arm carries a ball or weight at its free end, which by gravity always holds the arm in a vertical position, and hence automatically determines the correct position of the globe and the direction of the sun's rays upon its surface at different points in its revolution.

F indicates a ring for representing the earth's orbit, and this ring is shown in Fig. 1 as being supported by a rod or wire $d'$, extending upward from the tripod-base.

$b'$ are indicators on the ring for giving the positions of the earth at the various seasons of the year.

By turning the crank at the end of rod B the arm C is carried around the ecliptic, the earth-globe always presenting the proper portion of its surface to the action of the sun's rays by means of the gravity ball or weight W. Thus Fig. 3 represents the position of the earth at the autumnal equinox, with the pointer directed to the equatorial line.

Fig. 4 illustrates the position of the earth at midsummer in the southern hemisphere, with the sun's rays in the tropic of Capricorn and the earth at the perihelion of its orbit.

Fig. 5 represents the position of the earth at the vernal equinox in the northern hemisphere, the rays directed toward the equatorial line.

Fig. 6 represents the position of the earth in midsummer in the northern hemisphere, with the rays directed to the tropic of Cancer and the earth at the aphelion point of its orbit.

In Fig. 2 I have illustrated a modified form of my device.

The ring is supported by wires from the T-coupling $a$, and within the ring a chart or rim $x$ is attached, which may bear on its face the months, days, zodiacal signs, &c. It will be also noticed that the parts are reversed in position in Fig. 2—that is to say, the globe is upon the opposite end of the axis from that shown in the other figures, and the other parts are correspondingly mounted.

I may form the ecliptic ring of a flat disk or chart, upon which may be indicated the months, days, signs, &c. I may also use a lunar globe, which may be mounted to revolve upon shaft D similarly to globe G.

My invention is of very simple construction, being devoid of complicated gearing and expensive fittings, and while the parts are so constructed and arranged as to not be liable to derangement or breakage this desirable end is not attained by increased cost of production. In fact, both complication and expense are avoided, and a better and cheaper device for my purpose is one of the results of my construction.

What I desire to secure by Letters Patent and claim is—

A tellurian comprising a vertical support, a horizontal rod journaled at the upper end thereof, a sun-sphere and pointer mounted on one end of said horizontal rod and a crank at the other end, a counterbalanced arm rigidly connected to said rod, an axis journaled at the end of said arm, a globe mounted on one end of said axis and a counterbalancing-weight at the opposite end thereof, and an elliptical ring for representing the configuration of the earth's orbit rigidly mounted with the sun-sphere at the junction of the major and minor axes of the ring, substantially as described.

In testimony whereof I affix my signature in presence of two witnesses.

NEEL JOHN McARTHUR.

Witnesses:
JOHN W. SMITH,
WM. WILSON.